June 22, 1943.  B. E. WINKLER  2,322,611
WELDING GUN
Filed April 27, 1940  2 Sheets-Sheet 1

INVENTOR.
Bruno E. Winkler

June 22, 1943.        B. E. WINKLER        2,322,611
WELDING GUN
Filed April 27, 1940        2 Sheets-Sheet 2

INVENTOR.
Bruno E. Winkler

Patented June 22, 1943

2,322,611

UNITED STATES PATENT OFFICE 2,322,611

WELDING GUN

Bruno E. Winkler, Detroit, Mich.

Application April 27, 1940, Serial No. 331,963

6 Claims. (Cl. 303—6)

My invention relates to an improved welding gun, and its principal object is to provide a gun of the character referred to which is light in weight, simple in construction, and which may be moved with greater facility from place to place, thus meeting the requirements of jobbing work more nearly than guns now employed for continuous production operations.

In welding guns as generally constructed the mechanism for controlling welding time, delay and holding time is contained in a unit separate from the gun itself, the said unit being hung from a stationary support and connected to the gun by fluid pressure means, an arrangement which results in interference with the work to be operated on, especially when the gun is used inside of a structure such as an automobile body. The whole unit is, furthermore, cumbersome, expensive, difficult to move around, and costly in maintenance, due to the many pipes and other connections.

According to the present invention, the apparatus for controlling and timing the welding cycle is carried upon the gun itself, being mounted upon the rear of the main pressure cylinder and built wholly or partly within the handle, so that the only connection between the gun and the building structure resides in the main transformer cable and the air supply pipe. This results in a very light and easily handled tool, the center of gravity of which is close to the handle so as to avoid excessive overhang and thus reduce the fatigue of the operator during long periods of continuous operation.

Another object of my said invention is to provide what may be termed a single-stroke gun, as distinguished from the so-called repeat welders, a single welding cycle being in the present case carried through its various phases automatically and completely after pressure of the starting button or trigger, regardless of how soon the operator removes his finger from the same, the various operating and timing instrumentalities being initially adjusted to a predetermined cycle.

With these and other objects in view, I will now describe a preferred embodiment of my said invention with reference to the accompanying drawings, in which—

Like characters designate corresponding parts throughout the several views.

Figure 1:
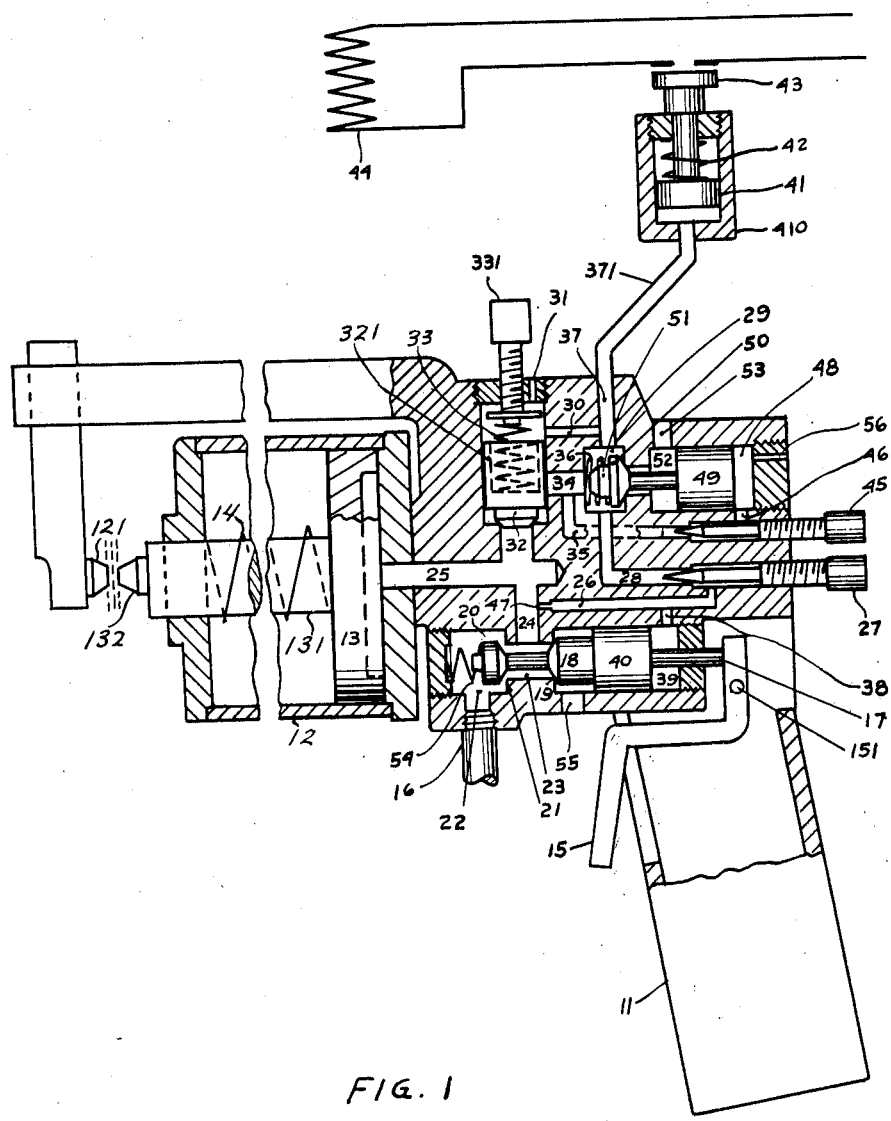
Figure 1 is a fragmentary vertical sectional elevation taken through the axis of the main cylinder.

Referring more particularly to Figure 1 of the drawings, 11 designates the handle of the welding gun, upon the upper end of which is carried the main cylinder 12 having therewithin the piston 13 which is operated in one direction by fluid pressure, as will be hereinafter explained, and in the other direction by the helical spring 14. 15 is the operating trigger pivoted as at 151 to the handle and having a portion adapted to press upon the stem 17 of the main controlling valve 18, the said valve and the trigger being normally held in its initial or inoperative position by the helical spring 54. This valve, however, is shown in the drawing in its operative position, that is to say, the trigger is being pressed upon and the valve 18 is forced upon its seat 19, thereby shutting off the opening 55 which is normally open to the atmosphere.

Integral with the main valve 18 is a second valve 20 which is normally held upon its seat 21 by the spring 54, but as shown in the drawing it is removed from its seat so that the chamber 23 is open to air pressure which flows from the chamber 22 by way of the air supply pipe 16. By this arrangement, it will be seen that when the trigger is in normal or dead position, the chamber 23 is open to the atmosphere, while when the trigger is in the position shown in the drawing, the said chamber is cut off from the atmosphere and air is admitted by way of the chamber 22 and through the passages 24, 25 to the piston 13. The piston 13 has the rod 131 which extends through the far end of the cylinder, not shown, and carries the usual movable electrode or welding tip which, at the proper time, is caused to engage the work between it and the fixed electrode as will be understood. The arrangement of the fixed and movable electrodes 121, 132, respectively is so well known in the art that it is not deemed necessary to further illustrate or describe them. It will be seen, however, that when the chamber 23 is opened to the atmosphere through the valve 18, the piston 13 is allowed to return under the action of its spring 14. Above the passage 25 is an opening normally closed by the valve 32 which is held upon its seat by the helical spring 33, said valve being raised from its seat when a predetermined pressure has been built up beneath it, this pressure being determined by adjustment of the spring 33 through the thumb screw 331. The valve 32 is provided with a piston 321 and above this piston is a small opening 31 which is at all times open to the atmosphere, whereby the said piston is relieved of back pressure and at the same time the speed of its movement is limited for a purpose to be hereinafter explained.

Communicating with the passages 24 is a restricted opening 47 which leads into a laterally extending port 26 and through the port 28 with the chamber 29, and from this chamber extends a port 30 leading into the space above the valve 32 from which air may escape into the atmosphere through the small opening 31 above referred to. Between the ports 26 and 28, however, is a needle valve 27 adapted to control the amount of air passing through the said ports and openings (this being the holding-time valve). The port 30 is located in the path of the piston-like head 321 of the valve 32 so that when the valve 32 is lifted from its seat, the port 30 is closed.

Communicating with the port 26 is an opening 38 which leads to the chamber 39, back of the piston 40 which carries the valve 18, so that when a predetermined pressure is built up behind the said piston the valve 18 will be held upon its seat, as shown in the drawing, and the valve 20 will be lifted from its seat 21. Communicating with the opening in which operates the valve 32 and its piston is a port 34 which leads downwards through the port 35, which extends laterally to an opening 46 in the wall of a chamber 48. In the chamber 48 is a piston 49 having a stem extending through the chamber 52 and carrying upon its end a valve 50 and a valve 51, so that when the piston 321 of the valve 32 is raised, pressure from the passage 25 may pass by way of the port 34, 35 and opening 46 so as to move the piston 49 and raise the valve 50 from its seat, and at the same time force the valve 51 upon its seat against the action of the helical spring 36. The chamber 48 has a restricted opening 56 extending into the atmosphere, and between the opening 46 and the port 35 is a needle valve 45 (which is the welding-time valve) by which the rate of flow through this circuit is adjusted. Movement of the piston 49 in the manner just described is facilitated by an opening 53 which connects the space 52 back of the piston with the atmosphere. The valve 51 is for the purpose of admitting air at the proper time through the port 37 and pipe 371 to the cylinder 410 which operates a transformer switch 43. When, for example, the valve 51 is in the open position, as shown in the drawings, and the piston of the valve 32 is raised, pressure will pass by the port 34, chamber 29, port 37, and pipe 371 to the underside of the piston 41, the upper end of which carries the switch member 43 and, when the valve 50 is opened and the valve 51 closed, the pipe 371 is in communication, through opening 53, with the atmosphere, allowing the piston 41 to descend under the action of the helical spring 42, thereby breaking the circuit of the switch 43.

Having now described in a general way the various moving parts of my device, together with the circuits provided for their control and operation, I will now explain the operation of the gun through a complete cycle making a single weld. The trigger 15 being pulled into the position shown in the drawings, applying pressure to the rod 17 and forcing the valve 18 onto its seat 19, the valve 20 is at the same time lifted from its seat 21 and pressure from the pipe 16 and chamber 22 is admitted into the chamber 23, thence passing through the passages 24, 25 to the rear of the piston 13, overcoming the spring 14 and bringing the movable and fixed electrodes into such relative positions as to grasp the work therebetween. At the same time the fluid pressure passes through the opening 47 and port 26, around the valve 27, and through the port 28 into the chamber 29, and thence through ports 30 and 31 into the atmosphere. While the air has followed the circuit last described, sufficient pressure has been built up behind the piston 13 to overcome the spring 14 and bring the movable electrode into its operative position. The pressure thus built up acts upon the spring-loaded valve 32, which is the delay valve. When the said pressure is sufficient to overcome the spring 33, the valve 32 is lifted from its seat so as to open the port 34 and close the port 30. By closing the port 30, the previously described circuit, passing through port 26, around needle valve 27, and through chamber 29 and port 30, is prevented from exhausting by the piston 321 or the valve 32 which closes the port 30. In this manner pressure is built up in this circuit and passes through the port 38 into the chamber 39 so as to act upon the piston 40, thereby holding the valve 18 upon its seat 19 and raising the valve 20 from its seat 21, as shown in the drawings.

The operator may now release the trigger 15 so that from now on the cycle is continued by the pressures built up in the various openings.

The port 30 being closed by the piston 321, and air pressure being admitted through the port 34 into the chamber 29, the said pressure passes through port 37 and pipe 371 to the piston 41, raising the latter and closing the switch 43 so as to send current from the transformer 44 to the electrodes to form a weld.

Pressure is at the same time sent through port 35 and around the needle valve 45 into the chamber 48. Due to the opening of the valve 45 and to the constant opening 56, it takes a certain time to build up sufficient pressure to move the piston 49 and thereby move the latter so as to lift the valve 50 from its seat and close the valve 51. When this is done, however, the fluid pressure is cut off from the cylinder 410 and the cylinder is exhausted through pipe 371, port 37, chambers 29 and 52, and through the port 53 into the atmosphere. By this means the spring 42 is allowed to open the switch 43, thus terminating the welding period.

Opening of the valve 53 has also provided exhausting means for fluid pressure in the chamber 39, this pressure escaping from said chamber through port 38, around the needle valve 27, through the port 28, through chambers 29 and 52, and out to the atmosphere through the opening 53. The speed with which the chamber 39 is exhausted depends upon the setting of the needle valve 27 in relation to the opening 47 in the port 26, and by this speed is determined the time during which the electrodes remain closed upon the work after the welding current is shut off.

After the chamber 39 is sufficiently exhausted, the spring 54 forces the valve 20 back upon its seat 21 and at the same time lifts the valve 18 from its seat 19. Closing of the valve 20 cuts off the fluid pressure supply from the pipe 16 and the opening of the valve 18 provides an exhaust through the opening 55, thereby releasing the fluid pressure from back of the piston 13 to be discharged through the opening 55 and also releasing the pressure from the underside of the valve 32, so that the spring 33 may force the said valve with its piston 321 into its lower position, as shown in the drawings, thereby releasing the pressure from the chamber 48 through opening 46 and needle valve 45, the said pressure being exhausted through the constant opening 56. By this means the valve 50 is forced by the spring 36 onto its seat, as shown in the drawings, thereby closing the exhaust. The welding time is determined by varying the air influx over the needle 45 in relation to the exhaust action through the opening 56. The piston 13 is finally returned by the spring 14 to its original position as shown, thus removing the welding tip from the work and completing the cycle. If the operator now pulls the trigger 15 again, the same cycle will be started and another weld be made without any further attention of the operator. It will be noted that if the operator does not release the pressure on the trigger 15, the welding tips will remain closed on the work indefinitely.

It will be observed from the foregoing description and by reference to the drawings that I have provided a welding gun in which the various phases of the welding cycle can be predetermined by adjustments under the control of the operator and upon the gun itself, which is of great advantage over the present equipment in which it is necessary for the operator to leave his work station in order to make the necessary adjustments on the timer. He must then return to the gun and try out the same, and if still incorrect he must repeat the proceedings until the correct timer setting is obtained. It will be observed, further, that in my device the use of vacuum tubes, electrical relays, and switches is eliminated, thus avoiding considerable trouble and reducing the expense of maintenance and repair which at present obtains in these devices.

Figure 2:
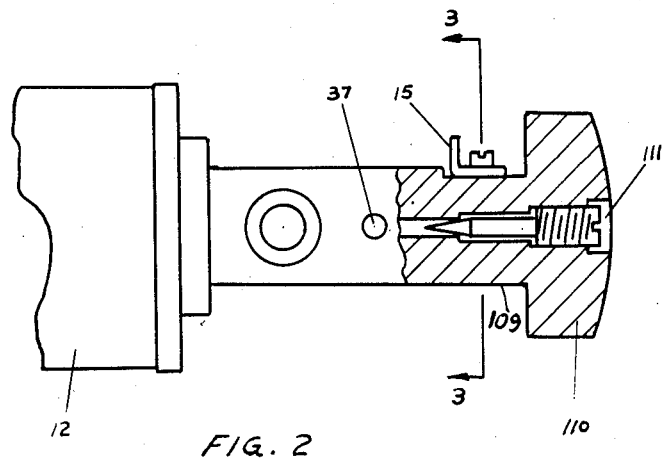
Figure 2 is a fragmentary horizontal section, taken approximately through the said axis, showing certain modifications to be hereinafter described.
Figure 3:
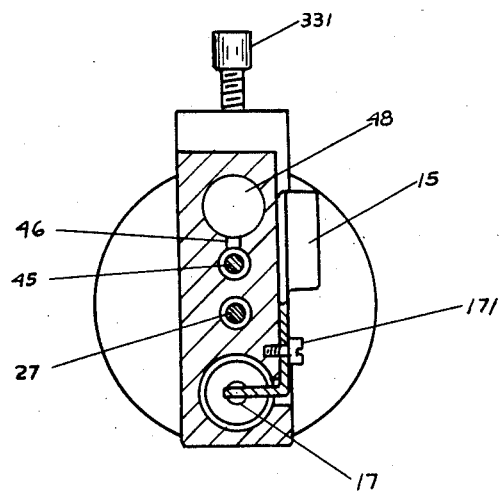
Figure 3 is a vertical section taken on line 3—3 of Figure 2.

While I have herein described and shown a preferred embodiment of my invention, it will be readily understood by those skilled in the art to which the same pertains that I may make various modifications in detail to suit any particular or peculiar requirements without departing from the spirit of my invention as defined in the appended claims. For example, in some cases, in order to make my improved gun more compact and at the same time more convenient to handle, I may dispense with the downwardly projecting handle designated 11 in Figure 1, and may so shape the upper portion of the same as to present an effective gripping means. Such an arrangement is shown in Figures 2 and 3 of the drawings in which the said upper portion is formed with a narrow waist, as at 109, and with laterally bulging portions 110 which may be gripped in the hand. In this case the needle valves, instead of having projecting heads, as shown in Figure 1, are positioned within recesses, as designated 111, in which the heads of the valves 27 are sunk, the said valve being in this case operated by some form of key as well known in the art. In this case, also, the trigger 15 will be pivoted as at 171 and swung back and forth upon the said pivot so as to operate the piston 40, which is accomplished by an inwardly extending portion upon the trigger, abutting upon the end of the stem 17, as shown in Figure 3.

Having thus described my said invention, what I claim and desire to secure by Letters Patent of the United States is:

1. An air operated timer for actuating at least two pistons for different time periods of predetermined length, comprising main and secondary pistons each normally held in retracted position within its cylinder by spring pressure, a body member having an air accumulating chamber and carrying a spring pressed delay valve and a manually operated air inlet valve normally closed by spring pressure and, when opened, connecting a source of compressed air with said accumulating chamber, said body member also having passages connecting the air accumulating chamber with the main piston, with the delay valve, and with a bypass arranged to bleed air from the accumulating chamber until the delay valve is opened, said body member also having a secondary air passage normally closed by the delay valve leading from the air accumulating chamber to the secondary piston, the delay valve being arranged so that its opening will simultaneously stop said bleeding of air from the accumulating chamber and admit air to said secondary air passage to move the secondary piston, means for closing said secondary air passage behind the delay valve after a predetermined time, and simultaneously permitting the exhausting of air from the secondary cylinder, and means dependent upon the movement of said closing means for later closing the air inlet valve and permitting exhausting of all compressed air from the accumulating chamber and connected passages and return of the main piston and delay valve to retracted positions.

2. An air operated timer of the character set forth in claim 1 wherein an adjustable needle valve is mounted in the bleeder bypass to control the bleeding of air from the accumulating chamber.

3. An air operated timer of the character set forth in claim 1 wherein the air inlet valve is a spring pressed plunger valve slidable in a chamber in the body member, said chamber being connected behind the plunger with the accumulating chamber through a portion of said bleeder bypass, whereby the air inlet valve is held in fully opened position by compressed air until the cycle of operations is completed.

4. An air operated timer of the character set forth in claim 1 wherein the first mentioned closing means comprises a spring pressed plunger valve slidable in a chamber in the body member, said body member having a bypass bleeding air from the secondary air passage to the chamber behind said plunger valve, and an adjustable needle valve mounted in said bypass to control the flow of air behind said plunger valve.

5. An air operated timer of the character set forth in claim 1 wherein a needle valve controls the bleeding of air from the accumulating chamber until the delay valve is opened, and a second needle valve is instrumental in determining the length of time before the secondary air passage is closed.

6. An air operated timer for actuating at least two pistons for different predetermined time periods, comprising main and secondary pistons each normally held in retracted position within its cylinder by spring pressure, a central body member carrying a manually operated air inlet valve, a spring-pressed delay valve instrumental in delaying the initiation of movement of the secondary piston until a predetermined time after initiation of movement of the main piston, a spring pressed plunger valve for controlling the duration of time air is admitted to the secondary piston, and a pair of needle valves, said body member also having an air accumulating chamber connected with a source of compressed aid when the air inlet valve is opened, a passage leading from the accumulating chamber to the main piston, a passage from the accumulating chamber to the delay valve, and a bleeder passage bleeding air from the accumulating chamber through a circuitous path in which is mounted one of the needle valves, a bypass from the bleeder passage to utilize compressed air in holding the air inlet valve open during a full cycle of operations, the body member also having a secondary air passage normally closed by the delay valve, and, upon opening of the delay valve by accumulated air pressure, conducting air to move the secondary piston, the opening of the delay valve also serving to prevent further bleeding of air to the atmosphere through said bleeder passage, said body member also having a bypass extending from said secondary air passage to a chamber behind said plunger valve and adapted to bleed air from the secondary air passage around the second of said needle valves until air accumulated behind the plunger valve overcomes its spring pressure, whereupon the plunger valve closes said secondary air passage behind the delay valve, whereby air from the secondary cylinder is permitted to exhaust, the movement of the plunger valve also opening to the atmosphere said bleeder passage to permit exhausting of air from behind the air inlet valve and enable the return of the air inlet valve through its spring pressure to normally closed position, the return movement of the air inlet valve permitting the exhausting of all compressed air from the accumulating chamber, main piston and connected passages.

BRUNO E. WINKLER.